United States Patent
Quappen

(10) Patent No.: US 9,593,717 B2
(45) Date of Patent: Mar. 14, 2017

(54) WATER LUBRICATED BEARING DEVICE

(75) Inventor: Arne Quappen, Göteborg (SE)

(73) Assignee: MINESTO AB, Västra, Frölunda (SE)

( * ) Notice: Subject to any disclaimer, the term of this patent is extended or adjusted under 35 U.S.C. 154(b) by 24 days.

(21) Appl. No.: 14/412,526

(22) PCT Filed: Jul. 5, 2012

(86) PCT No.: PCT/SE2012/050791
§ 371 (c)(1),
(2), (4) Date: Jun. 15, 2015

(87) PCT Pub. No.: WO2014/007706
PCT Pub. Date: Jan. 9, 2014

(65) Prior Publication Data

US 2015/0292555 A1    Oct. 15, 2015

(51) Int. Cl.
*F16C 32/06*    (2006.01)
*F16C 17/14*    (2006.01)
(Continued)

(52) U.S. Cl.
CPC .......... *F16C 32/064* (2013.01); *F03B 13/264* (2013.01); *F16C 17/10* (2013.01);
(Continued)

(58) Field of Classification Search
CPC .... F16C 32/06; F16C 32/0629; F16C 32/064; F16C 32/0644; F16C 32/0681;
(Continued)

(56) References Cited

U.S. PATENT DOCUMENTS 1,516,349 A    11/1924 Rittenhouse
2,330,456 A *  9/1943 Topinka ................. F16G 11/00
                                                279/9.1
(Continued)

FOREIGN PATENT DOCUMENTS

CH           622320 A5 *  3/1981 ............ F16C 29/025
CN       101087949 A      12/2007
(Continued)

OTHER PUBLICATIONS

International Preliminary Report on Patentability received for PCT Patent Application No. PCT/SE2012/050791, mailed on Jan. 15, 2015, 7 pages.
(Continued)

*Primary Examiner* — Alan B Waits
(74) *Attorney, Agent, or Firm* — Morrison & Foerster LLP

(57) ABSTRACT

The arrangement comprises a fluid bearing comprising a first fluid bearing element located in a bearing housing and a piston located in a pump housing. The bearing housing comprises a bearing housing opening. The pump housing comprises a pump housing opening. The first fluid bearing element is connected to the piston by means of a connection means extending from the first fluid bearing element through the bearing housing opening to the piston through the pump housing opening. The piston is arranged to reciprocate in the pump housing. The pump housing is connected to a fluid reservoir by means of a first inlet. The bearing housing comprises a first outlet for allowing fluid to exit the bearing housing. The arrangement further comprises a fluid transport means fluidly connecting the pump housing and the bearing housing.

28 Claims, 4 Drawing Sheets

(51) Int. Cl.
*F16G 15/08* (2006.01)
*F16C 17/10* (2006.01)
*F16C 17/26* (2006.01)
*F16C 33/10* (2006.01)
*F03B 13/26* (2006.01)
*F16C 39/04* (2006.01)
*F16F 9/32* (2006.01)

(52) U.S. Cl.
CPC .............. *F16C 17/14* (2013.01); *F16C 17/26* (2013.01); *F16C 33/109* (2013.01); *F16C 33/1045* (2013.01); *F16C 33/1085* (2013.01); *F16C 39/04* (2013.01); *F16G 15/08* (2013.01); *F05B 2240/53* (2013.01); *F05B 2240/917* (2013.01); *F16F 9/3278* (2013.01); *Y02E 10/28* (2013.01); *Y02E 10/38* (2013.01)

(58) Field of Classification Search
CPC ...... F16C 32/0696; F16C 39/04; F16C 17/10; F16C 17/14; F16C 17/26; F16C 33/1045; F16C 33/1085; F16C 33/109; F16G 15/08; E01D 19/14; E01D 19/16; F03B 13/16; F03B 13/18; F03B 13/264; F16F 9/3278; F05B 2240/53; F05B 2240/917; Y02E 10/28; Y02E 10/38
See application file for complete search history.

(56) References Cited

U.S. PATENT DOCUMENTS

| | | | |
|---|---|---|---|
| 3,806,208 A | 4/1974 | Bruck | |
| 3,927,921 A | 12/1975 | Woolley | |
| 3,964,805 A | 6/1976 | Schulien | |
| 4,043,209 A * | 8/1977 | Bea | F16C 32/0644 417/269 |
| 4,076,463 A | 2/1978 | Welczer | |
| 4,754,157 A | 6/1988 | Windle | |
| 6,149,306 A | 11/2000 | Zosi | |
| 6,942,666 B2 * | 9/2005 | Overaker | A61B 17/0401 606/232 |
| 8,051,615 B2 * | 11/2011 | Mathews | F16G 11/00 403/78 |

FOREIGN PATENT DOCUMENTS

| | | | |
|---|---|---|---|
| EP | 0819859 A2 | | 1/1998 |
| EP | 1816345 A1 | | 8/2007 |
| GB | 2479877 A | | 11/2011 |
| JP | 61-99796 A | | 5/1986 |
| JP | 63-253179 A | | 10/1988 |
| JP | 8-61370 A | | 3/1996 |
| JP | 2012257393 A | * | 12/2012 |

OTHER PUBLICATIONS

International Search Report and Written Opinion received for PCT Patent Application No. PCT/SE2012/050791, mailed on Mar. 5, 2013, 10 pages.

Extended European Search Report (includes Supplementary European Search Report and European Search Opinion) received for European Patent Application No. 13813592.6, mailed on Feb. 5, 2016, 5 pages.

Office Action received for Japanese Patent Application No. 2015-520110, mailed on Apr. 25, 2016, 5 pages (English Translation only).

Office Action received for Chinese Patent Application No. 2012800744932, mailed on Jun. 6, 2016, 13 Pages (6 pages of English Translation and 7 Pages of Official Copy).

Office Action received for European Patent Application No. 12880608.0, mailed on Sep. 16, 2016, 4 pages.

* cited by examiner

WATER LUBRICATED BEARING DEVICE

CROSS REFERENCE TO RELATED APPLICATION

This application is a U.S. National Stage patent application of PCT/SE2012/050791, filed on Jul. 5, 2012, the entire content of which is incorporated herein by reference.

FIELD OF THE INVENTION

The invention relates to an arrangement for a self-lubricating bearing. The arrangement comprises a fluid bearing comprising a first fluid bearing element located in a bearing housing and a piston located in a pump housing. The bearing housing comprises a bearing housing opening. The pump housing comprises a pump housing opening. The first fluid bearing element is connected to the piston by means of a connection means extending from the first fluid bearing element through the bearing housing opening to the piston through the pump housing opening. The piston is arranged to reciprocate in the pump housing. The pump housing is connected to a fluid reservoir by means of a first inlet. The bearing housing comprises a first outlet for allowing fluid to exit the bearing housing.

BACKGROUND OF THE INVENTION

Equipment such as wires, rods or tethers being fixedly attached at one end may be sensitive to forces arising from rotation, i.e. the equipment can be said to be sensitive to torsion. Such equipment may have to be attached to an arrangement allowing for the arrangement to rotate while the forces on the equipment remain zero or at least small enough not to cause damage to the equipment. Such arrangements usually comprise bearings in order to allow at least part of the arrangement to rotate.

Examples of bearing arrangements suitable for rotation may comprise fluid bearings. The construction of such arrangements may be complicated and may depend on an external power source to provide lubrication for the bearing. Having an external power source increases the complexity and cost for the bearing arrangement.

There is thus a need for an improved bearing arrangement.

SUMMARY OF THE INVENTION

The object of the present invention is to provide an inventive arrangement for a self-lubricating bearing where the previously mentioned problems are avoided. This object is achieved by the features of the characterising portion of claim 1, wherein a longitudinal movement of the bearing housing causes the piston to cause a pumping action, whereby fluid from the fluid reservoir is pumped to the fluid bearing through the hollow rod, lubricating the fluid bearing.

The invention relates to an arrangement for a self-lubricating bearing. The arrangement comprises a fluid bearing comprising a first fluid bearing element located in a bearing housing and a piston located in a pump housing. The bearing housing comprises a bearing housing opening and the pump housing comprises a pump housing opening. The first fluid bearing element is connected to the piston by means of a connection means extending from the first fluid bearing element through the bearing housing opening to the piston through the pump housing opening. The piston is arranged to reciprocate in the pump housing. The pump housing is connected to a fluid reservoir by means of a first inlet. The bearing housing comprises a first outlet for allowing fluid to exit the bearing housing. The arrangement further comprises a fluid transport means fluidly connecting the pump housing and the bearing housing. A longitudinal movement of the bearing housing or the pump housing causes the piston to cause a pumping action in the pump housing, whereby fluid from the fluid reservoir is pumped to the fluid bearing through the fluid transport means, lubricating the fluid bearing.

One advantage with the arrangement according to the invention is that the arrangement allows for an easier way for connecting rotationally weak or torsion weak equipment. Rotationally weak or torsion weak equipment means that the equipment is sensitive to torsion forces. The tension forces may give rise to unwanted twisting of the equipment thereby damaging or destroying it. The bearing housing in the arrangement is arranged to rotate 360° around the first fluid bearing element in a direction perpendicular to a longitudinal axis of the arrangement. This means that the bearing housing will take up torsion forces that would normally cause the connected equipment to rotate and twist. Instead the bearing housing will rotate due to the torsion forces leaving the attached equipment less exposed to torsion forces. The arrangement allows for reduced friction in the fluid bearing thereby leading to that the bearing housing rotates more easily around the first fluid bearing element.

The arrangement may be submerged in fluid wherein the fluid reservoir comprises the surrounding fluid. The arrangement may also be arranged to be used on land. In this case a separate fluid reservoir needs to be connected to the arrangement.

The fluid bearing is self-lubricated by means of that the bearing housing or the pump housing is arranged to move longitudinally both upwards and downwards when exposed to longitudinal forces. Since the first fluid bearing element is attached to the piston by means of a connections means, the piston will reciprocate when the bearing housing or the pump housing moves longitudinally up and/or down. The reciprocating motion of the piston will cause a pumping action which pumps fluid from the fluid reservoir to the fluid bearing through the fluid transport means. The fluid is sucked by the pump action from the reservoir into the pump housing and further through the fluid transport means to the bearing housing. The fluid transport means may comprise for instance a hollow rod or at least one tube connecting the pump housing and the bearing housing. When using a hollow rod, the rod acts as connection means. The hollow rod comprises at least one inlet and one outlet enabling the fluid to be transported through the hollow rod. When using at least one tube for fluid transport means the connections means may be a solid rod connecting the first fluid bearing element and the piston. A combination of a hollow rod and at least one tube is also possible.

The pump housing may be attached to a support structure and the bearing housing may be attached to a tether. The longitudinal movement of the bearing housing may then be caused by a linear force from the tether acting on the bearing housing. Alternatively, the bearing housing may be attached to a support structure and the pump housing may be attached to a tether. The longitudinal movement of the pump housing may then be caused by a linear force from the tether acting on the pump housing. The arrangement can be made to function as a swivel, thereby allowing for both rotational and translational movement of connected equipment. One type of swivel arrangement can be made by securing the pump housing of the arrangement according to the invention to a support structure and the bearing housing to a tether or vice versa. Depending on the application the tether may be more or less torsion weak and unwanted twisting of the tether may cause damage to it. The tether may be arranged to withstand longitudinal forces arising from machinery attached to the tether. Movement of the machinery may cause the tether to move longitudinally, thereby causing the bearing housing to move.

One example of machinery that can be attached to the tether and thereby to the arrangement is an underwater kite for producing electrical energy from tidal currents. The kite is described in EP 1816345; the document is hereby enclosed in its entirety by reference. If the tether attached to the kite were to twist the speed of the kite is reduced thereby leading to a reduction in energy production.

A hydraulic accumulator may be attached to the pump housing, where the hydraulic accumulator is arranged to store fluid under pressure and is arranged to lubricate the fluid bearing through the hollow rod when the piston is not reciprocating.

Movement of the machinery may be discontinuous leading to that the lubrication of the fluid bearing is not continuous as the pumping action ceases during periods of no longitudinal movement of the bearing housing or pump housing. In order to overcome this problem a hydraulic accumulator may be attached to the pump housing in which fluid under pressure can be accumulated during normal pumping action of the piston. The fluid under pressure can be used to lubricate the fluid bearing when there is no longitudinal movement of the bearing housing or pump housing. The accumulator may be any kind suitable for storing fluid under pressure and releasing fluid once predetermined conditions are met. A predetermined condition may be that the pressure in the bearing housing is below a threshold pressure or that no longitudinal movement of the bearing housing or pump housing has taken place for a certain period of time. The hydraulic accumulator can be arranged to provide fluid to the fluid bearing through the fluid transport means connecting the piston to the first fluid bearing element or to provide the fluid to the bearing housing directly. Alternatively the hydraulic accumulator can be connected to an external pump providing the accumulator with the pressurized fluid.

The pump housing may further comprise a first spring arranged to be compressed and decompressed when the piston reciprocates in the pump housing. When the bearing housing stops moving, the spring decompresses, which moves the piston back towards an equilibrium position. This causes pumping of fluid from the fluid reservoir through the pump housing to the bearing housing, lubricating the fluid bearing.

One purpose of the spring is to bring the piston back towards an equilibrium position in the pump housing when the spring is compressed. This may be useful when the bearing housing moves slowly or when forces acting on the bearing housing cause the piston to be fixed at an end position in the pump housing. The spring is also arranged in the pump housing in order to absorb sudden movements caused by the bearing housing. The spring compresses and absorbs some of the force caused by the bearing housing thereby protecting the pump housing from damage. The spring constant is chosen such that the spring is resilient enough to absorb shocks but still not resilient such that the piston is hindered from moving during normal operation.

The first spring may be placed above the piston in the pump housing. The first spring may thereby be compressed when the piston moves toward a top end position. The first spring may alternatively be placed below the piston in the pump housing. The first spring may thereby be compressed when the piston moves toward a bottom end position. It is also possible to have both a first and a second spring in the pump housing on either side of the piston thereby having a double sided spring effect. The first and second springs may for instance be cup springs, coil springs or torsion springs. The first and second spring may also be made by an elastomer. The location of the spring may also be dependent on whether the pump housing or the bearing housing is attached to the foundation as this affects the orientation of the pump housing.

The first inlet of the pump housing may be located at a bottom end of the pump housing. The first inlet of the pump housing may alternatively be located at a top end of the pump housing. If the pump housing comprises only one inlet, the inlet may be positioned either at the bottom end or the top end of the pump housing. The position of the first inlet may depend on the desired type of action of the pump housing and may also be chosen depending on the location of the spring.

A second inlet may be located at the top of the pump housing. The pumping housing may comprise two inlets located at the top and bottom of the pump housing respectively in order for fluid to be sucked in by the pumping action both when the piston moves towards a bottom end position and a top end position. The first inlet and the second inlet are one-way valves which only allow fluid to enter the pump housing. When the pump action presses the fluid against the one-way valve, the valve closes thereby preventing the fluid from exiting the pump housing and instead forcing the fluid to be transported through the fluid transport means to the bearing housing. Any suitable one-way valve may be used.

The first outlet may be located at the bearing housing opening. In order for lubrication of the fluid bearing to take place the fluid needs to be constantly moved over the first fluid bearing element with a minimum pressure. An outlet on the bearing housing ensures that the fluid can exit the bearing housing. The first outlet may be placed in conjunction with the bearing housing opening in order for the fluid to exit the bearing housing. The first outlet may be a one-way valve which is closed towards the surrounding fluid and which is arranged to open when the pressure in the bearing housing exceeds a predetermined pressure thereby regulating the pressure in the bearing housing within suitable limits for the first fluid bearing element to maintain a correct position and lubrication. Alternatively the first outlet is an open channel allowing fluid to flow freely out from the bearing housing. The design of the first fluid bearing element, the fluid bearing housing and the first outlet is arranged to regulate the pressure in the bearing housing.

The first outlet may be located at the top of the bearing housing and the bearing housing opening is sealed against the fluid reservoir. An alternative position of the first outlet is to place the first outlet at the top of the bearing housing. This allows the fluid to take a different path over the first fluid bearing element.

A first fluid bearing element and a second fluid bearing element may be placed in the bearing housing. The first and second fluid bearing elements are connected to the piston by means of the connection means. In order to increase the bearing surface a second fluid bearing element connected to the connection means may be placed in the fluid bearing housing. The second fluid bearing element may be of the same kind as the first fluid bearing element or of a different kind depending on the desired properties of the complete fluid bearing.

The arrangement may be submerged in fluid. The fluid reservoir may be connected to the surrounding fluid. The arrangement may be designed to be used in marine applications such as off-shore or any kind of mooring applications. The arrangement may then be in direct connection with the surrounding fluid, which may be any kind of sea water such as salt water, sweet water or brackish water. Other applications for the arrangement are also possible wherein the arrangement is submerged in a fluid different from water. In such a case the fluid needs to have suitable lubrication characteristics. In case the pump housing is connected to the surrounding fluid at least one filter arrangement may be arranged on the pump housing in conjunction to the at least one inlet in order to filtrate out particles that may cause abrasive wear on the different parts of the arrangement or other damaging particles. An advantage of using the surrounding fluid is that no oil, which can pollute the environment, is needed for the lubrication of the first bearing.

The fluid reservoir may alternatively form a closed lubrication system comprising a second fluid different from the surrounding fluid. An alternative solution to have an open system where the lubrication fluid is taken from the surrounding fluid is to have a closed lubrication system wherein a second fluid is allowed to flow through the arrangement by means of the pumping action caused by the piston. The second fluid may for instance be water, water and glycol or a suitable lubrication oil. In case of use of a lubrication oil, the lubrication oil may be chosen to be environmentally friendly such that an eventual leakage of the oil does not pollute the surrounding fluid. The closed system works also when the arrangement is not submerged.

The second fluid may have a higher viscosity than the surrounding fluid. Having a second fluid with a higher viscosity than the surrounding fluid, e.g. a viscosity higher than water, leads to that the tolerance demands for manufacturing the bearings can be reduced. It is also possible to have a non-Newtonian fluid as the second fluid.

The parts making up the arrangement are all chosen to withstand being exposed to fluid at least on the inside surfaces. At least the housings, the connection means, piston and fluid bearing elements are preferably made of a metal or metal alloy resistant to corrosion, but may also be made from durable plastic.

DETAILED DESCRIPTION OF THE INVENTION

Figure 1:
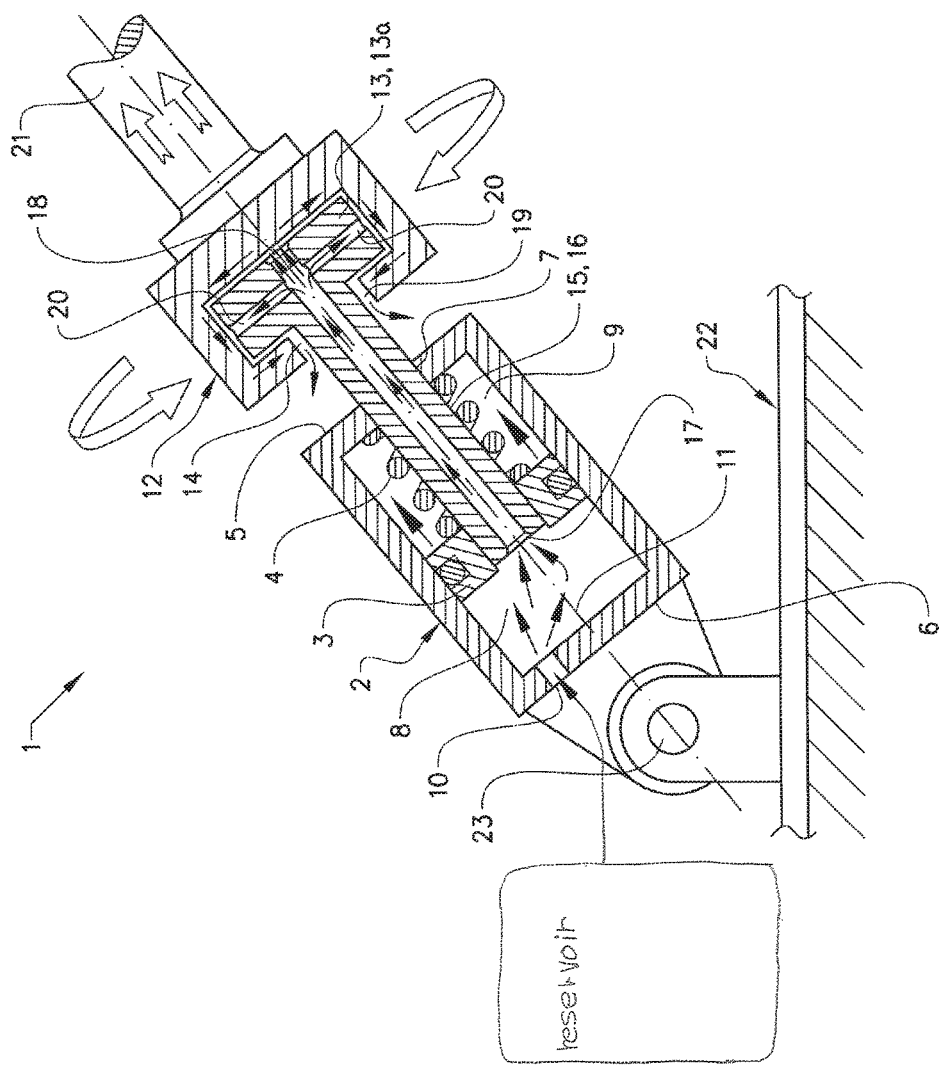
FIG. 1 schematically describes an arrangement for a self-lubricating bearing according to the invention.

FIG. 1 schematically describes an arrangement 1 for a self-lubricating bearing according to the invention. The arrangement 1 comprises a pump housing 2 comprising a piston 3 and a first spring 4. The pump housing 2 further comprises a top end 5, a bottom end 6 and a pump housing opening 7 located at the top end 5. The pump housing opening 7 is normally sealed against the surroundings. The pump housing 2 further comprises a first compartment 8 and a second compartment 9. A first inlet 10 is located at the bottom end 6 of the pump housing 2. The arrangement 1 comprises a longitudinal axis 11 running through the centre of the pump housing 2 and the bearing housing 12. The first spring 4 is placed above the piston 3 in a longitudinal direction.

The arrangement 1 further comprises a bearing housing 12 wherein a fluid bearing 13 is located. The fluid bearing 13 comprises a first fluid bearing element 13a. The bearing housing 12 also comprises a bearing housing opening 14. The piston 3 and the first fluid bearing element 13a are connected by means of a connection means 15 in the form of a hollow rod 16. The connection means 15 extend from the piston 3 through the pump housing opening 7 to the first fluid bearing element 13a through the bearing housing opening 14. The connection means 15 is attached to the piston 3 such that when the connection means 15 moves the piston 3 moves with the connection means 15.

In FIG. 1 the connection means 15 also function as fluid transport means. The hollow rod 16 has a first rod opening 17 extending out into the pump housing 2 through the piston 3 and a second rod opening 18 extending out into the bearing housing 12. The connection means 15 may be fixed in the pump housing opening 7. The connection means 15 may also be arranged to rotate in the pump housing opening 7 causing the piston 3 to rotate in the pump housing 2. However, during normal operation of the arrangement 1 the friction of the first fluid bearing 13 is considerably lower than the friction between the connection means 15 and the pump housing opening 7. This leads to that the connection means 15 will only rotate in case the fluid bearing 13 fails. This leads to that the connection means 15 will not be damaged in case the fluid bearing 13 fails.

A first outlet 19 is placed in conjunction with the bearing housing opening 14 allowing fluid to exit the bearing housing 12. Further, fluid bearing channels 20 are seen in the first fluid bearing element 13a. The channels 20 are present in order for the fluid to be more evenly distributed over the first fluid bearing element 13a. The fluid bearing channels 20 are not necessary for the fluid bearing 13 to function properly. The general principle of a fluid bearing is considered to be known to the person skilled in the art and is therefore not further explained.

The fluid bearing can be made to have a shape that allows for the fluid bearing to stay within a predetermined part of the fluid bearing housing regardless of the pressure of the fluid in the bearing housing.

In FIG. 1 equipment 21 connected to the bearing housing 12 can be seen. As mentioned the equipment 21 can for instance be a tether, a wire or a rod which is rotationally weak. The bearing housing 12 is intended to take up the torsional forces acting on the equipment 21 and cause the entire equipment 21 and bearing housing 12 to rotate as one, thereby avoiding that the equipment 21 becomes damaged due to twisting.

The arrangement 1 is further connected to a foundation 22 by means of a foundation joint 23. The foundation joint 23 and the arrangement 1 together forms a swivel allowing both rotational movement and movement about a horizontal axis extending through the foundation joint 23. The longitudinal axis 11 follows the movement of the arrangement 1 when the arrangement 1 moves around the foundation joint 23.

The arrows in FIG. 1 are intended to illustrate an example of the motion of the bearing housing 12 and the piston 3 as well as the transport of fluid through the fluid transport means. As the bearing housing 12 moves longitudinally upwards, i.e. away from the foundation 22, the piston 3 will move towards the top end 5 of the pump housing 2 leading to that fluid will be sucked into the first compartment 8 of the pump housing 2. When the piston 3 thereafter moves longitudinally downwards, the fluid in the first compartment 8 will be pressed through the first rod opening 17 toward the second rod opening 18 and further out into the bearing housing 12. The fluid present in the bearing housing 12 will be replaced by the fluid pumped by each longitudinal movement of the piston 3 and exits the bearing housing by the first outlet 19. The second compartment 9 may comprise a fluid such as a compressible gas or be connected to the surrounding fluid such that the arrangement 1 may function properly as a pump. The fluid in the second compartment 9 may act as a dampener when it is compressed thereby aiding to reduce wear of the pump housing 2.

Figure 2:
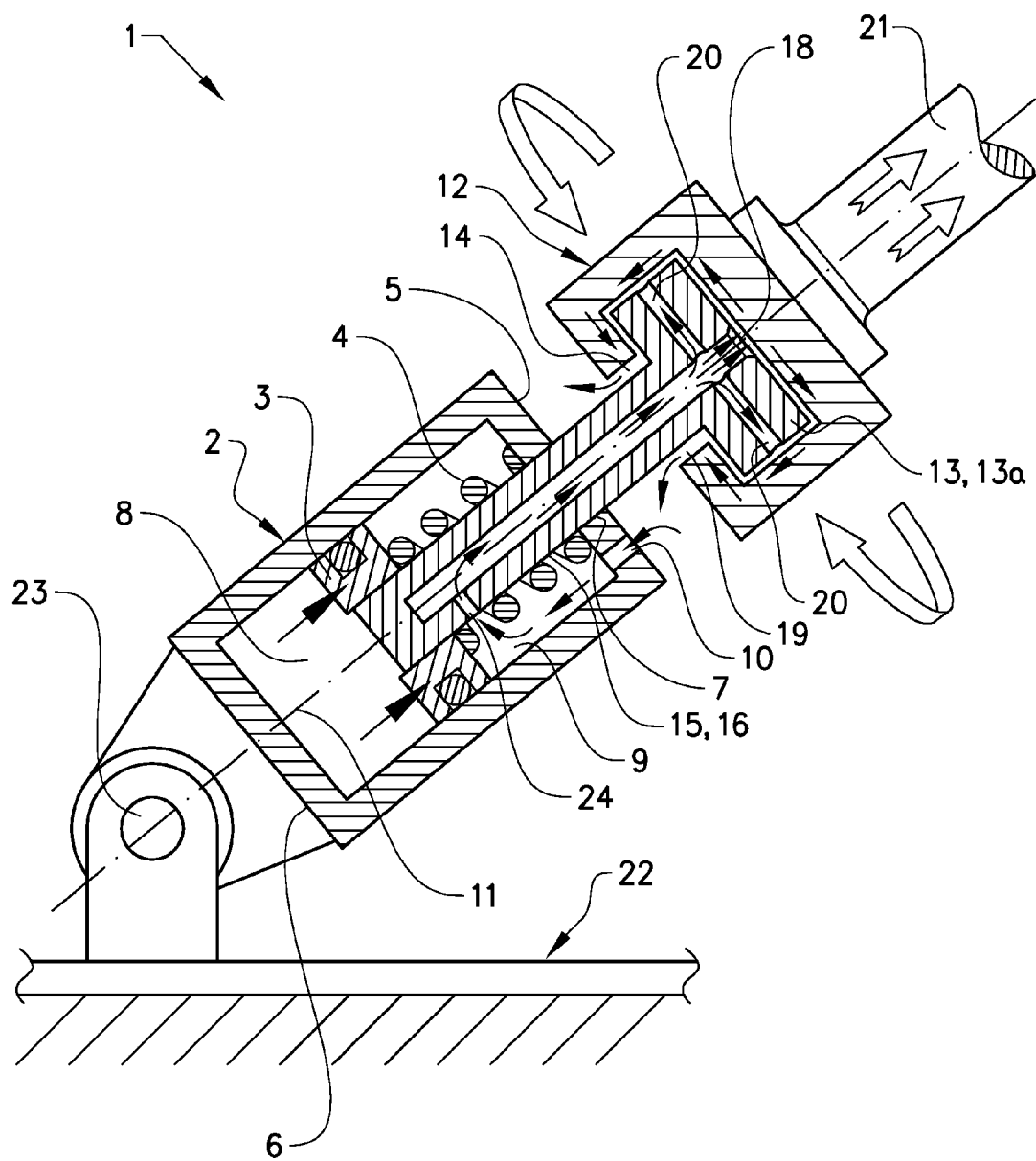
FIG. 2 schematically describes an arrangement for a self-lubricating bearing according to the invention.

FIG. 2 schematically describes an arrangement 1 for a self-lubricating bearing according to the invention. In FIG. 2 the first inlet 10 is arranged on a top end 5 of the pump housing 2. The hollow rod 16 in this case comprises a third rod opening 24 placed on the side of the hollow rod 16 connected to compartment 9 to allow water to pass through the hollow rod 16 during pumping action of the piston 3. As the bearing housing 12 moves longitudinally downwards, i.e. towards the foundation 22, the piston 3 will move towards the bottom end 6 of the pump housing 2 leading to that fluid will be sucked into the second compartment 9 of the pump housing 2. When the piston 3 thereafter moves longitudinally upwards, the fluid in the second compartment 9 will be pressed through the third rod opening 24 toward the second rod opening 18 and further out into the bearing housing 12. The first compartment 8 may comprise a fluid such as a compressible gas or be connected to the surrounding fluid such that the arrangement may function properly as a pump. The fluid in the first compartment 8 may act as a dampener when it is compressed thereby aiding to reduce wear of the pump housing 2.

Figure 3:
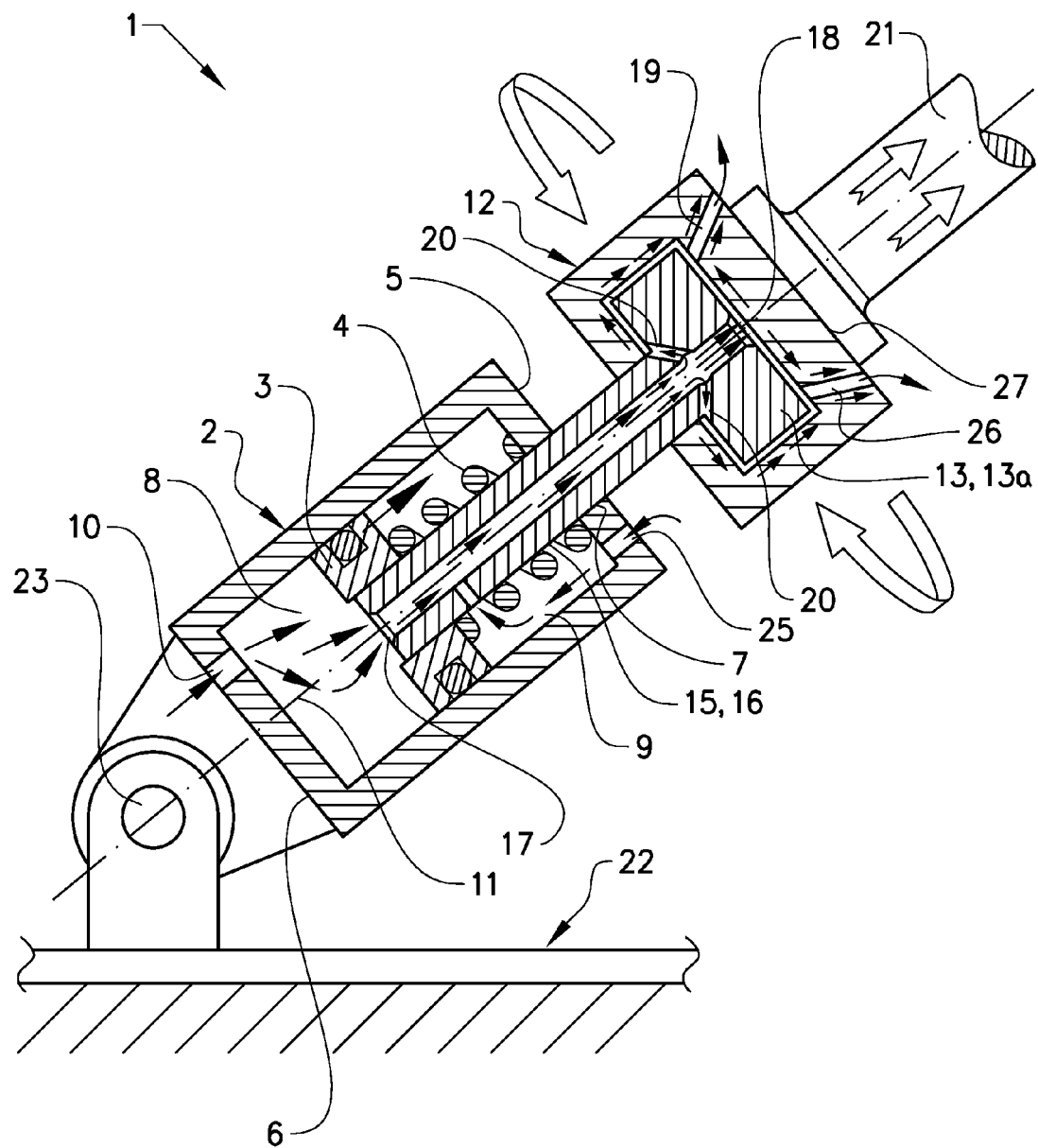
FIG. 3 schematically describes an arrangement for a self-lubricating bearing according to the invention.

FIG. 3 schematically describes an arrangement 1 for a self-lubricating bearing according to the invention. In FIG. 3 the pump housing 2 comprises a first inlet 10 located at the bottom end 6 of the pump housing 2 and a second inlet 25 located at the top end 5 of the pump housing 2. This enables fluid to be pumped when the piston 3 moves towards either the top end 5 or the bottom end 6 of the pump housing 2. The hollow rod 16 comprises a first rod opening 17 extending out into the pump housing 2 through the piston 3, a second rod opening 18 extending out into the bearing housing 12 and a third rod opening 24 placed on the side of the hollow rod 16 to allow water to pass through the hollow rod 16 during pumping action of the piston 3.

In FIG. 3, the fluid bearing housing comprises a first outlet 19 and a second outlet 26 located on a top part 27 of the bearing housing 12. The bearing housing opening 14 is sealed leading all the fluid out through the first outlet 19 and the second outlet 26. It is also possible to have the bearing housing opening 14 open thereby leading fluid out from the bearing housing 12 through both the bearing housing opening 14 and the first outlet 19 and second outlet 26. The pumping action of the arrangement 1 in FIG. 3 is a combination of the pumping actions described in conjunction with FIGS. 1 and 2.

FIGS. 1-3 all show a hollow rod functioning as the fluid transport means. As mentioned in the summary it is possible to replace the hollow rod with a solid rod or similar to function only as connection means 15. In this case, at least one tube (not shown) connects the first pump housing 2 and the first bearing housing 12 and functions as the fluid transport means. The tubes are connected to the first compartment 8 and/or second compartment 9 of the pump housing 2 and to the bearing housing 12 by means of pump housing outlets on the pump housing 2 and bearing housing inlets on the bearing housing 12 respectively. The pump housing outlets and bearing housing inlets may be any kind of suitable connectors for tubes. The fluid is transferred by the at least one tube from the pump housing to the bearing housing by the pumping action of the piston 3 in the pump housing 2 such that the fluid bearing is lubricated. The fluid bearing element 13a may in this case be attached to the equipment 21 while the pump housing 2 is attached to the foundation 23. Alternatively, the pump housing 2 is attached to the equipment 21 while the fluid bearing element 13a is attached to the foundation 23. The pump housing 2, bearing housing 12, equipment 21 and foundation 23 of the arrangement 1 may also be configured as described in conjunction with FIGS. 1-3. The placement of the tube connector means on both the pump housing 2 and the bearing housing 12 may depend on the pump action of the piston 3 and may thus be varied according to the different examples described above. The pump housing and bearing housing having tubes as fluid transport means may be combined with all examples of inlets in the pump housing and outlets in the bearing housing. One advantage with having tubes is that the arrangement is easy to manufacture and that the inertia of the bearing element is significantly smaller than the inertia for the bearing housing leading to that when the equipment is attached to the fluid bearing element the equipment is exposed to even less rotational force.

Figure 4:
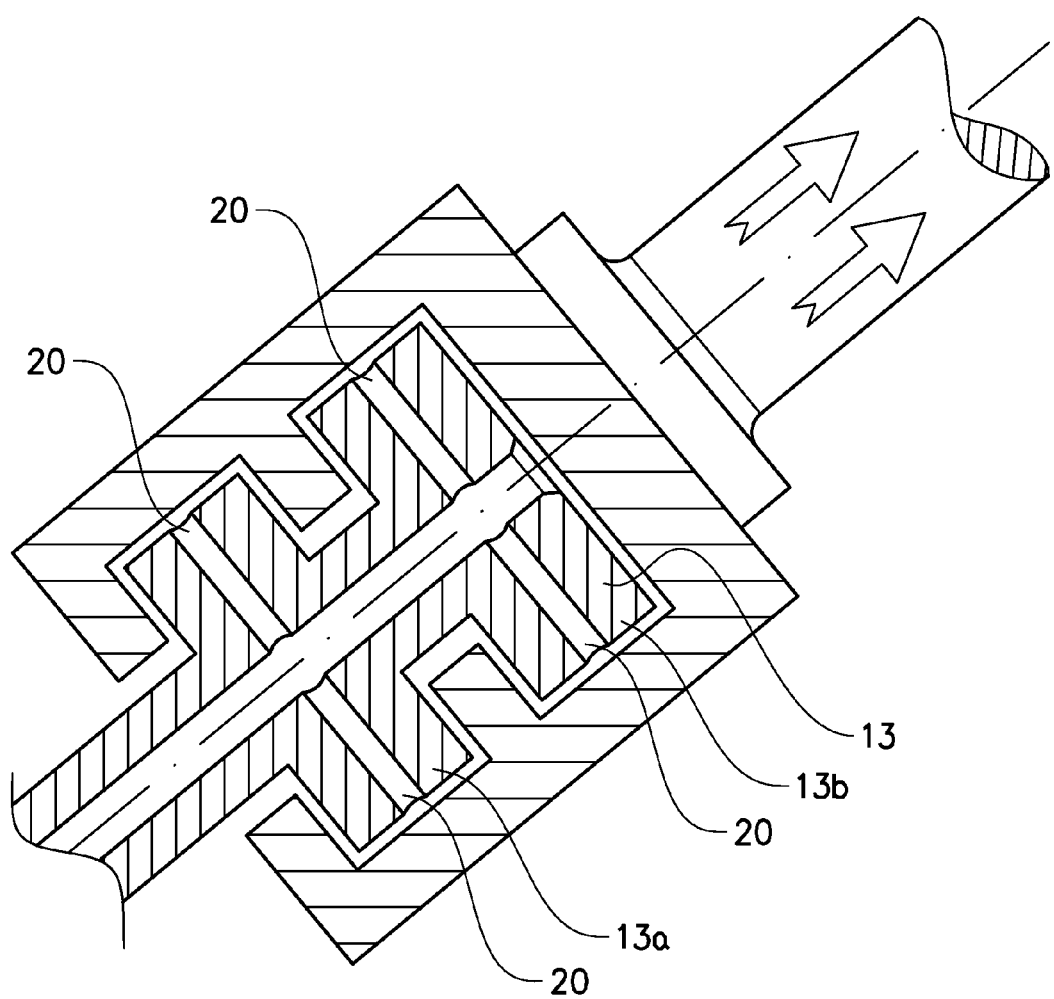
FIG. 4 schematically shows a bearing housing with two fluid bearing elements included.

FIG. 4 schematically shows the bearing housing 12 comprising a first fluid bearing element 13a and second fluid bearing element 13b. The first fluid bearing element 13a and the second fluid bearing element 13b are connected by means of the connection means 15 in the form of a hollow rod 16. Any configuration of outlets 19, 26 from the bearing housing 12 as described above is possible with this configuration. It is also possible to have more than two fluid bearing elements in the bearing housing 12.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Accordingly, the drawings and the description thereto are to be regarded as illustrative in nature, and not restrictive.

For instance, as mentioned above the bearing housing may be connected to the foundation and the pump housing may be connected to the equipment. Further, the different placements of the inlets in the pumping housing can be combined in any combination with the different placements of the outlets of the bearing housing. Although FIGS. 1-3 only describe one inlet at the top end and bottom end of the pump housing, the number of inlets as well as the dimensions of the inlet may be varied in order for the arrangement to provide the correct amount of fluid to the bearing housing.

The invention claimed is:

1. Arrangement for a self-lubricating bearing, the arrangement comprising:
    a fluid bearing comprising a first fluid bearing element located in a bearing housing and a piston located in a pump housing, the bearing housing comprising a bearing housing opening, the pump housing comprising a pump housing opening, the first fluid bearing element being connected to the piston by a connection member extending from the first fluid bearing element through the bearing housing opening to the piston through the pump housing opening, the piston being arranged to reciprocate in the pump housing, wherein the pump housing is connected to a fluid reservoir by a first inlet, the bearing housing comprises a first outlet for allowing fluid to exit the bearing housing, the arrangement further comprises a fluid transport member fluidly connecting the pump housing and the bearing housing, a longitudinal movement of the bearing housing or the pump housing causes the piston to cause a pumping action, whereby fluid from the fluid reservoir is pumped to the fluid bearing through the fluid transport member, lubricating the fluid bearing, the pump housing is attached to a support structure and the bearing housing is attached to a tether, and the longitudinal movement of the bearing housing is caused by a linear force from the tether acting on the bearing housing.

2. Arrangement for a self-lubricating bearing according to claim 1, wherein the pump housing further comprises a first spring arranged to be compressed and decompressed when the piston moves in the pump housing, where, when the bearing housing or the pump housing stops moving, the spring decompresses moving the piston back towards an equilibrium position, causing pumping of fluid from the fluid reservoir through the pump housing to the bearing housing, lubricating the fluid bearing.

3. Arrangement for a self-lubricating bearing according to claim 2, wherein the first spring is placed above the piston in the pump housing, the spring thereby being compressed when the piston moves toward the top end.

4. Arrangement for a self-lubricating bearing according to claim 2, wherein the first spring is placed below the piston in the pump housing, the spring thereby being compressed when the piston moves toward the bottom end.

5. Arrangement for a self-lubricating bearing according to claim 1, wherein the first inlet of the pump housing is located at a bottom end of the pump housing.

6. Arrangement for a self-lubricating bearing according to claim 5, wherein a second inlet is located at the top end of the pump housing.

7. Arrangement for a self-lubricating bearing according to claim 1, wherein the first inlet of the pump housing is located at a top end of the pump housing.

8. Arrangement for a self-lubricating bearing according to claim 1, wherein the first outlet is located at the bearing housing opening.

9. Arrangement for a self-lubricating bearing according to claim 1, wherein the first outlet is located at the top of the bearing housing and the bearing housing opening is sealed against the fluid reservoir.

10. Arrangement for a self-lubricating bearing according to claim 1, wherein the fluid bearing comprises the first fluid bearing element and a second fluid bearing element being placed in the bearing housing, the first fluid bearing element and the second fluid bearing element being connected to the piston by said connection member.

11. Arrangement for a self-lubricating bearing according to claim 1, wherein the arrangement is submerged in fluid and the fluid reservoir is configured to use surrounding fluid.

12. Arrangement for a self-lubricating bearing according to claim 1, wherein the arrangement is submerged in fluid and the fluid reservoir comprises a second fluid different from fluid forming a closed lubrication system.

13. Arrangement for a self-lubricating bearing according to claim 12, wherein the second fluid has a higher viscosity than the fluid of the closed lubrication system.

14. Arrangement for a self-lubricating bearing according to claim 1, wherein the fluid transport member comprises a hollow rod acting as connection member or at least one tube connecting the pump housing and the bearing housing.

15. Arrangement for a self-lubricating bearing, the arrangement comprising:

a fluid bearing comprising a first fluid bearing element located in a bearing housing and a piston located in a pump housing, the bearing housing comprising a bearing housing opening, the pump housing comprising a pump housing opening, the first fluid bearing element being connected to the piston by a connection member extending from the first fluid bearing element through the bearing housing opening to the piston through the pump housing opening, the piston being arranged to reciprocate in the pump housing, wherein the pump housing is connected to a fluid reservoir by a first inlet, the bearing housing comprises a first outlet for allowing fluid to exit the bearing housing, the arrangement further comprises a fluid transport member fluidly connecting the pump housing and the bearing housing, a longitudinal movement of the bearing housing or the pump housing causes the piston to cause a pumping action, whereby fluid from the fluid reservoir is pumped to the fluid bearing through the fluid transport member, lubricating the fluid bearing, the bearing housing is attached to a support structure and the pump housing is attached to a tether, and the longitudinal movement of the pump housing is caused by a linear force from the tether acting on the pump housing.

16. Arrangement for a self-lubricating bearing according to claim 15, wherein the pump housing further comprises a first spring arranged to be compressed and decompressed when the piston moves in the pump housing, where, when the bearing housing or the pump housing stops moving, the spring decompresses moving the piston back towards an equilibrium position, causing pumping of fluid from the fluid reservoir through the pump housing to the bearing housing, lubricating the fluid bearing.

17. Arrangement for a self-lubricating bearing according to claim 16, wherein the first spring is placed above the piston in the pump housing, the spring thereby being compressed when the piston moves toward the top end.

18. Arrangement for a self-lubricating bearing according to claim 16, wherein the first spring is placed below the piston in the pump housing, the spring thereby being compressed when the piston moves toward the bottom end.

19. Arrangement for a self-lubricating bearing according to claim 15, wherein the first inlet of the pump housing is located at a bottom end of the pump housing.

20. Arrangement for a self-lubricating bearing according to claim 19, wherein a second inlet is located at the top end of the pump housing.

21. Arrangement for a self-lubricating bearing according to claim 15, wherein the first inlet of the pump housing is located at a top end of the pump housing.

22. Arrangement for a self-lubricating bearing according to claim 15, wherein the first outlet is located at the bearing housing opening.

23. Arrangement for a self-lubricating bearing according to claim 15, wherein the first outlet is located at the top of the bearing housing and the bearing housing opening is sealed against the fluid reservoir.

24. Arrangement for a self-lubricating bearing according to claim 15, wherein the fluid bearing comprises the first fluid bearing element and a second fluid bearing element being placed in the bearing housing, the first fluid bearing element and the second fluid bearing element being connected to the piston by said connection member.

25. Arrangement for a self-lubricating bearing according to claim 15, wherein the arrangement is submerged in fluid and the fluid reservoir is configured to use surrounding fluid.

26. Arrangement for a self-lubricating bearing according to claim 15, wherein the arrangement is submerged in fluid and the fluid reservoir comprises a second fluid different from fluid forming a closed lubrication system.

27. Arrangement for a self-lubricating bearing according to claim 26, wherein the second fluid has a higher viscosity than the fluid of the closed lubrication system.

28. Arrangement for a self-lubricating bearing according to claim 15, wherein the fluid transport member comprises a hollow rod acting as connection member or at least one tube connecting the pump housing and the bearing housing.

\* \* \* \* \*